United States Patent [19]

Ockman

[11] Patent Number: 4,700,318
[45] Date of Patent: Oct. 13, 1987

[54] PROJECT CONSTRUCTION WITH DEPICTION MEANS AND METHODS

[76] Inventor: Stuart Ockman, 210 Copples La., Wallingford, Pa. 19086

[21] Appl. No.: 641,160

[22] Filed: Aug. 16, 1984

Related U.S. Application Data

[63] Continuation-in-part of Ser. No. 559,706, Dec. 9, 1983, abandoned.

[51] Int. Cl.⁴ .................. G06F 15/40; G06F 15/60
[52] U.S. Cl. ........................... 364/518; 364/512; 364/468; 434/108
[58] Field of Search ............... 364/518, 521, 512, 505, 364/400, 401, 419, 468; 334/108; 239/89 R, 69

[56] References Cited

U.S. PATENT DOCUMENTS

| | | | |
|---|---|---|---|
| 4,006,345 | 2/1977 | Bengtson | 434/108 |
| 4,017,831 | 4/1977 | Tieden et al. | 364/518 X |
| 4,019,027 | 4/1977 | Kelley | 434/108 X |
| 4,108,356 | 8/1978 | Bengtson | 434/108 X |
| 4,181,954 | 1/1980 | Rosenthal et al. | 364/512 X |
| 4,275,449 | 6/1981 | Aish | 364/512 |
| 4,332,012 | 5/1982 | Sekine et al. | 364/468 |
| 4,352,165 | 9/1982 | Hevenor | 364/900 |
| 4,468,732 | 8/1984 | Raver | 364/200 |
| 4,498,139 | 2/1985 | Malinovsky | 364/518 |

OTHER PUBLICATIONS

Computer Decisions (Oct. 1980), "Capturing the Third Dimension", Katz et al, pp. 50–53.
IEEE Computer Graphics & Applications (Oct. 1981), "Computer Graphics and the Practice of Architecture", Fullenwider et al, pp. 18–26.
It Can't Fasten, Cut, Hammer, Drill, Dig, Bend, Level or Lift, IBM Sales Information Advertisement.

*Primary Examiner*—Errol A. Krass
*Assistant Examiner*—Kevin J. Teska
*Attorney, Agent, or Firm*—Charles A. McClure

[57] ABSTRACT

Construction of projects such as buildings, bridges, dams, industrial plants, means of transport, or the like with the aid of means and methods for incremental depiction of such buildings, etc. Complex structural features of the construction project are divided into discrete increments and characterized by ordered work activities essential to their construction, then are depicted as in construction drawings to assist in supervision of the project itself. Such characterization and depiction enable urgencies to be emphasized, as by shading structural features due to be started or finished by some given time in the construction schedule differently from those not due until later—or to have been completed earlier. Likewise, during actual construction, deviations from the project schedule can be distinguished readily, as by depicting structural features due (or overdue) in boldest shading and by diminishing the boldness of shading the more time is available within which to complete subsequent features. The boldness of monochromatic shading may be by line thickness and/or continuity, whereas for polychromatic representation it may be by hue and/or brightness of color. Storage and retrieval of structural information, work activities, and other data are conveniently machine-assisted, as by an appropriately programmed general-purpose computer or by an otherwise similar computer especially dedicated to such purpose.

34 Claims, 10 Drawing Figures

PROJECT CONSTRUCTION WITH DEPICTION MEANS AND METHODS

This is a continuation-in-part of my similarly entitled copending application, Ser. No. 559,706 filed Dec. 9, 1983 and subsequently abandoned.

This invention relates to novel visual depiction of structural and optional indication of related features of construction projects in their planned and actual construction, and is applicable to construction of buildings, bridges, dams, industrial plants, means of transport, and the like.

Complex construction projects comprise too many components and involve too many structural and other interrelationships to be kept in mind without visual aids; such aids include drawings of the intended results, graphical and tabular schedules of the order in which components have to become available and be put into place relative to one another, and budgets, for example. However, it is difficult to assemble the pertinent information in an intelligible manner, especially for such diverse audience types as artisans, architects, contractors, engineers, financiers, and others. Also, in international construction projects, diversity of language is often a barrier to common understanding of what has to be done. Ordinarily, whenever a project requires a large set of drawings, it (and they) are divided into manageable subsets, often with the aid of hierarchical levels of detail in the various drawings, but such subdivided drawings require additional notations to render their interrelationships fully intellgible to individual viewers.

A primary object of the present invention is to provide novel visual depiction in representation of structural and related information about construction projects, especially complex ones.

Another object of this invention is to render intelligible at a glance the scheduled status of selected increments of structure at any given stage in a construction project.

A further object of the invention is to focus attention, in visual pictorial representations of projects undergoing construction, upon actual status of structural increments versus scheduled status.

Yet another object of this invention is to depict structural features of a construction project, whether scheduled only or actually being constructed, in such manner as to convey information about related non-structural features.

A still further object of the invention is to provide in the management of a construction project—whether scheduled only or in construction—a data base comprising indicia of discrete increments of structure, collocated indicia of sequentialized work activities, a superimposed time schedule for the project, and related data.

Other objects of the present invention, together with methods and means for attaining the various objects, will be apparent from the following description and the accompanying diagrams, which are presented by way of example rather than limitation.

In general, the objects of this invention are accomplished, in building and similar construction projects, by depicting selected structural features characterized by times of the work activities essential to their construction, plus (optionally) additional related data. Such characterization highlights urgencies, as by depicting structural features due to be started or to be completed by any given time in the construction schedule, more boldly than structural features not then due. At any given time during actual construction, structural features due (or overdue) for completion can be emphasized in similar manner, with little or no resort to verbal representation, in a mnemonically helpful way that is advantageous in reducing time, effort and cost or taking other remedial measures.

In summary detail, one is enabled to attain those objects by a sequence of steps including identifying, in advance, discrete increments of structure from start to finish of a given project, depicting the structural increments as in construction drawings, identifying discrete work activities essential to constructing the respective structural increments, assigning durations to the given activities, sequentializing the work activities among themselves, calculating start and finish times for the respective activities so sequentialized, preparing a time (and data) schedule from start to finish of the project, and storing the foregoing for retrieval.

Thus, the invention provides a data base management for and uses construction projects, with a time schedule as a key by which to relate indicia of sequentialized work activities and discrete increments of resulting structure, as well as other similarly related data. The resulting relational data base enables data associated with either the work activities or the structural increments to be related to the other by way of the time schedule—whether expressed in days, weeks, or other units of time—and enables the structural increments to be depicted with differential emphasis dependent upon urgencies of time or other important data item, such as cost.

Figure 1:
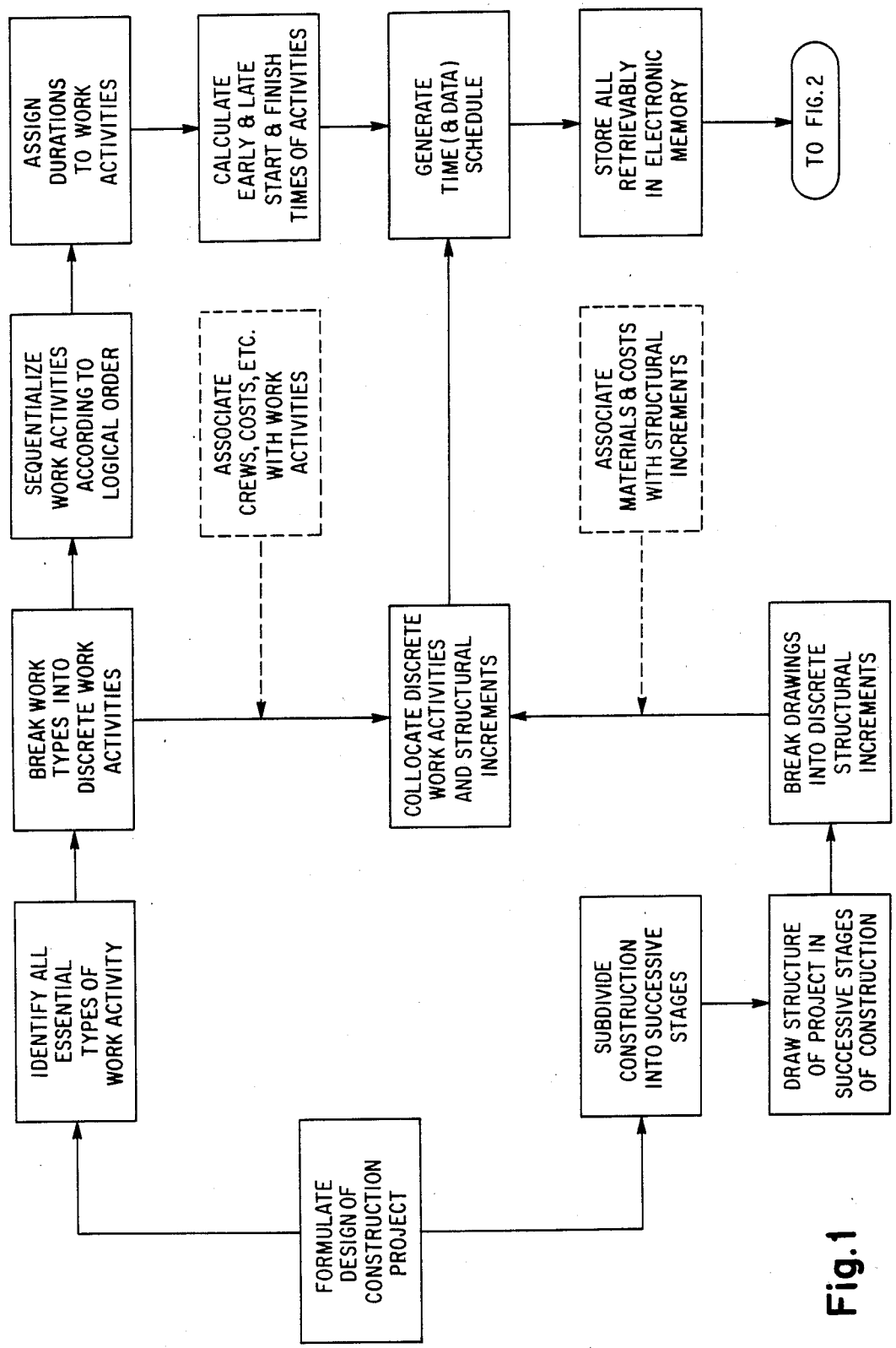
FIG. 1 is a block diagram of steps taken in practicing the present invention.

FIG. 1 illustrates these and related steps in more detail. The usual preliminary task is to formulate the design of a given construction project, as in terms of specific design criteria. The intended construction is subdivided into successive stages, and corresponding structural drawings are prepared, subdivided into discrete increments of structure. Likewise, kinds of work activity essential to the construction are identified and are broken down into discrete work activities. Optionally, as suggested within broken lines, related data may be associated with work activities (e.g., budgeted labor costs, crew sizes, and availability) or with structural increments (e.g., budgeted materials costs, quantities, and availability). Discrete structural increments and discrete work activities are collocated; that is, cross-referred to each other, in a one-to-one relationship.

Too, as noted in FIG. 1, durations are assigned to repsective work activities, whch are sequentialized among themselves in their logical order (i.e., which of them must precede which, and both early and late start and finish times are calculated for those activities. The resulting time data and the collocated discrete work activities and structural increments, together with other related data, are then used to generarte a time (and data) schedule for the entire construction project from start to finish, whereupon the schedule and related information are stored for subsequent retrieval, as in electronic memory means.

It will be understood that, in generality, the foregoing steps can be carried out by hand, with pencil and paper, but that large construction projects are so complex that it is convenient to have the assistance of inanimate apparatus, such as a digital computer, capable of speeding up the necessary logical and mathematical calculations and, optionally, the actual drafting process, so as to complete them within a reasonable time. Storage in electronic memory means follows naturally upon such machine-assisted steps.

Figure 2:
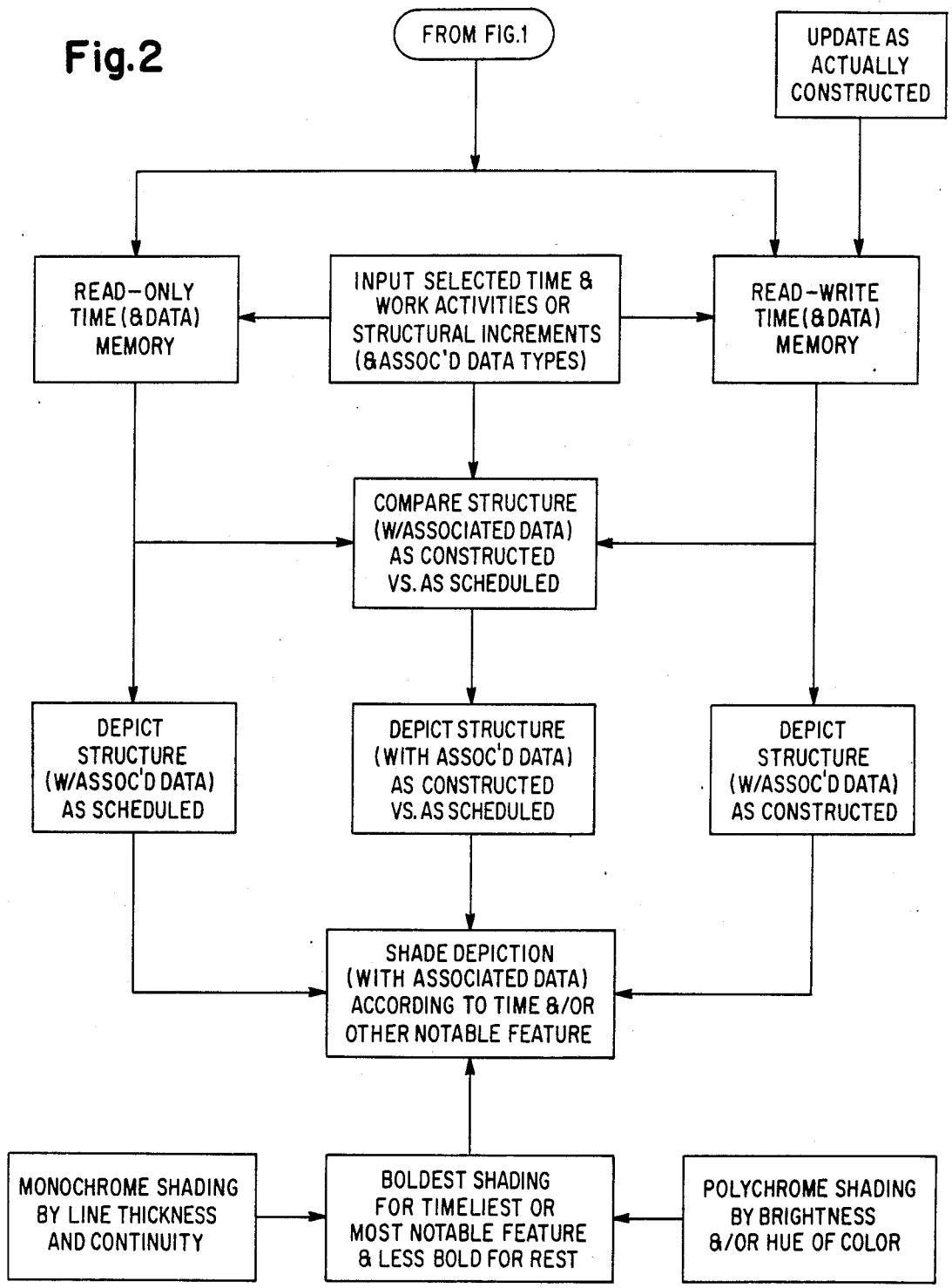
FIG. 2 is a block diagram of further steps taken in practicing this invention.

FIG. 2, in similar manner to FIG. 1, shows subsequent steps that, although also conceivably performable by hand, actually are reasonably feasible only with similar machine assistance. Indeed, FIG. 2 begins by showing the storing of information from FIG. 1 twice: once in a read-only memory, which represents the scheduled construction, and additionally in a read-write memory that can be updated from time to time in accordance with actual construction during the project. One or more intermediate types of memory (not shown), that may be overwritten only after due precautions are met may be interposed to represent target schedules bearing authorized changes from the original schedule, as wil be readily apparent. However, in the interest of clarity no such embodiment is described further here or illustrated in the drawings, nor are means shown for storing various operating programs, or for enabling essential calculation to be performed, as is conventional.

As shown in FIG. 2, the read-write memory is updated during the project with whatever departures from the schedule actually occur in the process of construction. The operator may retrieve upon request from either memory a structural depiction, as of any selected time within the schedule, characterized by time urgency or other data so stored. Also, the two memories can be compared in any such regards to disclose any discrepancies between the two, as where actual construction is ahead of schedule (or under budget) or—usually more important—is behind schedule (or over budget), for example. Furthermore, either of the memories can be compared with one or more intermediate memories to identify any differences between original or current plans and interim target schedules—and to depict such differences in terms of the corresponding structure.

As indicated further in FIG. 2, according to this invention the structural increments of interest (or related to other items of interest) are depicted so as to emphasize their status, such as urgency, timeliness, or expense, as well as (if desired) annotated with related numerical data or verbal comments. Such emphasis is accomplished by what is called "shading" and more particularly as quasi-mnemonic "boldness" of shading to signify comparable (but unlike) characteristics in monochromatic and polychromatic video representations.

Because of black's optical dullness it is especially suitable for both monochromatic and polychromatic depiction of structural features already completed or otherwise not requiring emphasis. As shown subsequently, boldness and monochrome shading is conveniently represented by line thickness and continuity; thus, continuous or solid lines are bolder than broken ones, and thick lines are bolder than normally thin ones. In polychrome, shading is represented by hue and/or brightness of color. Structure overdue for completion takes the boldest representation, such as a double-thick line in monochrome, or the boldest color (e.g., red) in polychrome. Those structures with later due dates drop off incrementally to less bold colors, as in spectral order (e.g., orange, yellow green, forest green, sky blue, navy blue, violet—or dark brown); for which suitable monochrome analogs are long-dash, short-dash, and dash-dot double-thick lines, followed by long-dash, short-dash, and dash-dot normal or single-thickness lines, respectively. For convenience, these relationships are summarized in the table below, although it will be recognized that others may be substituted with like effect.

TABLE 1

| | PRIORITIES AND SHADINGS | |
| PRIORITIES | POLYCHROME | MONOCHROME |
| --- | --- | --- |
| Greatest | Red | Continuous double-thick |
| Next greatest | Orange | Long-dash double-thick |
| Not so great | Yellow Green | Short-dash double-thick |
| Intermediate | Forest Green | Dash-dot double-thick |
| Less | Sky Blue | Long-dash single thickness |
| Even less | Navy Blue | Short-dash single thickness |
| Least | Dark Brown | Dash-dot single thickness |

Such graduated boldness of shading of the structural increments themselves conveys at a glance language-independent information that otherwise could be conveyed'if at all—only by relatively less effective methods. Of course, more or fewer gradations could be used, as could other shading methods in color or in monochrome. Users differ in preference for monochrome or polychrome emphasis of lines, but where area shading is desired the usual choice is color.

A useful supplementary representational aid is an intensity difference sufficient to be readily distinguishable from existing shadings. Whether continuous or intermittent, such differences are useful for emphasize areas, lines, or points of particular interest. For example, features to be removed may be illustrated as above, but at reduced (or increased) intensity, all or part of the time.

A blinking or flashing of the video display, such as between normal intensities, is useful for noting the presence of slack or float time in an activity for constructing a given structural increment. Blinking or flashing is also analogously useful to show temporary features (e.g., forms) that are both placed and removed during the course of the project. The showing of such temporary features preferably will alternate between the respective shadings characterizing their priorities of placement and removal, with the latter preferably diminished in intensity. Another use of blinking or flashing of the display, such as between normal and higher intensities, is to draw attention to structural features characterized by some data element (e.g., availability of work crews or materials, budgeted or actual costs or variances between them, or progress payments) not usually found in drawings. Verbal or graphical addenda may be included to similar effect, optionally with the aid or arrows, flags, or other pointers.

Figure 3:
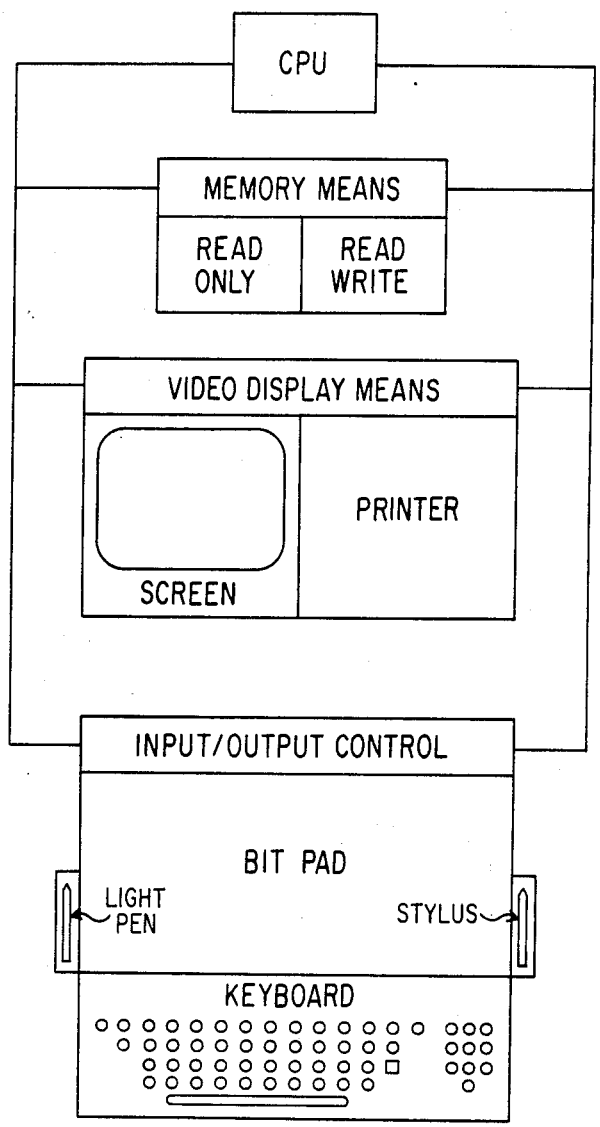
FIG. 3 is a largely schematic diagram of apparatus useful in practicing the invention.

FIG. 3 shows computer apparatus 30 comprising components to enable this invention to be practiced with a high degree of machine assistance. Despite the largely schematic diagram here, persons ordinarily skilled in the art of digital computers will readily understand what is meant, so as to become enabled to practice this invention with relative ease. Shown centrally is the video display means, which conveniently comprises a video screen and optionally a printer capable of displaying both alphanumerics and graphics. A plotter or photographic device may replace or supplement the printer as a static or non-transient display device, whereas video screens or equivalent devices can provice a dynamic or transient display, such as blinking or alternating over time between more than one representation, which is sometimes desirable. Connected to the video means is electronic memory means including both read-only and read-write memories, as previously described. Also connected thereto are a central processing unit (CPU) and input/output control means, as is conventional.

The input/output means conveniently includes not only the customary keyboard but also an electronic drafting surface or "bit pad" to transmit into the memory drawings made thereon, as with the indicated stylus. Alternatively, a light pen may be used similarly in conjunction with the screen. Not shown is conventional scanning means that may be used with pen-and-ink construction drawings to convert them into readily stored digital signals. The foregoing apparatus may be of general-purpose type or may be dedicated especially to practicing this invention.

Figure 3A:
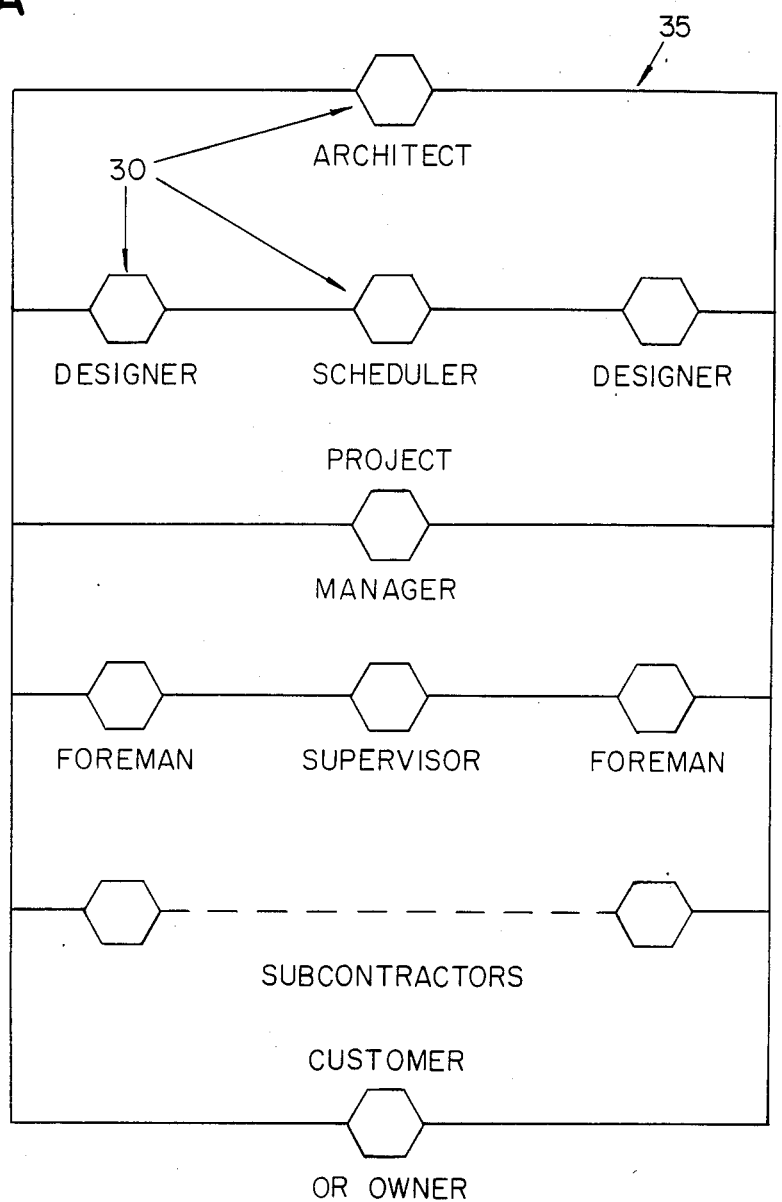
FIG. 3A is a schematic diagram of a network of workstations, each comprising apparatus such as is shown in the preceding view.

FIG. 3A shows shematically a number of computer workstations 30 connected together into communications network 35, which itself is useful according to this invention. One or more workstations 30 can readily be made available to major functional groups involved in any construction project (e.g., proposal, design, scheduling, procurement, construction, and startup); or trades (e.g., concrete, carpentry, electrical, plastering, and plumbing); and at levels of management from foremen through intermediate supervisory personnel to the project manager; and optionally even to higher line managers and possibly to pertinent staff personnel (e.g. financial, legal, or writers). This diagram fragmentarily illustrates representative availability of such apparatus in actual construction operations, specifically to the architect, designers, scheduler, contractor's managers, subcontractors, and customer. Of course, authority to revise the design or the schedule and update work performed and structure built should be limited to authorized persons. Great care should be taken for security of the data base.

It will be understood, of course, that such networking is well within the current state of the art and yet may take advantage of future improvements, inasmuch as the proprietary nature of this invention lies more in what is done than in the specific means by which it is accomplished. The same is true of the computer means. Individual stations 30 preferably have self-contained computer units or "nodes" with their own memory banks and so interconnected that what is stored in the memory of each is available to every other unit, and that unavailability of any unit does not interrrupt the network but only renders the unit and its memory unavailable until again on line. Also desirable are high resolution of display so as to show the structural increments in considerable detail, and rapid response because of the quantity of detail to be processed. A computer that meets these needs is readily available from Apollo Computer Inc. (of Chelmsford, Mass.) under the name DOMAIN.

FIG. shows a project scheduling network diagram resulting from sequentialization of work activities for constructing a minor portion of a building as shown in subseqeunt diagrams. About a dozen activities (designated by arrows) suffice to go from early to late stages, such as excavation, forming, placing, and stripping of foundation, stairs, and landing. The respective activities are designated by An above the arrow, where n is a numerical indicator of a given work activity; and by (d) below the arrow, where d is the number of days from start to finish of such activity. Thus, the first activity arrow is marked A1/(5); the 1 indicating that it is the first, and the 5 indicating that it is to require five days.

Figure 4:
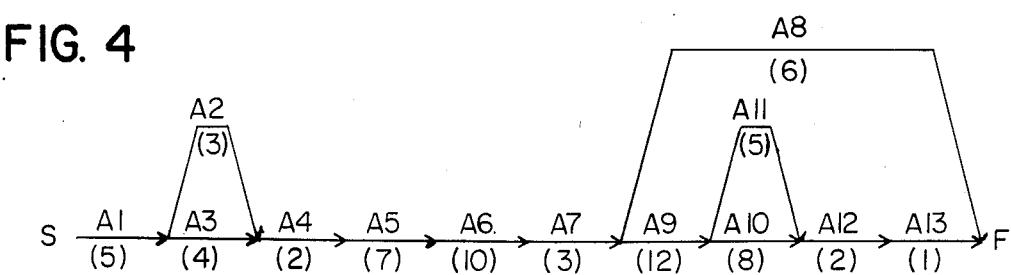
FIG. 4 is a project-scheduling network diagram of activities for a portion of a building construction project.

Thus, FIG. 4 shows the critical path as a horizontal line from left to right, made up of arrows to which are juxtaposed activity indicia A1, A3, A4, A5, A6, A7, A9, A10, A12, and A13; whereas activities A2, A8, and A11 all require less time to complete than do one or more parallel activities and so have slack time available to them, as appears more definitely in the next view. Activities may be identified in more complex manner (e.g., with indicia of trade type or other information), but these simple indicia will suffice here.

Tabulated below are the work activities and their indicia.

TABLE 2

| EXAMPLE OF WORK ACTIVITIES | |
|---|---|
| INDICIA | DESCRIPTIONS |
| A1 | Excavate for foundation slab |
| A2 | Place reinforcing for foundation slab |
| A3 | Place forms for foundation slab |
| A4 | Place foundation slab concrete |
| A5 | Place reinforcing for walls |
| A6 | Place forms for walls |
| A7 | Place wall concrete |
| A8 | Strip forms already placed, backfill |
| A9 | Place forms for stairs and landing |
| A10 | Place reinforcing for stairs |
| A11 | Place reinforcing for landing |
| A12 | Place stairs and landing concrete |
| A13 | Strip remaining forms |

Figure 5:
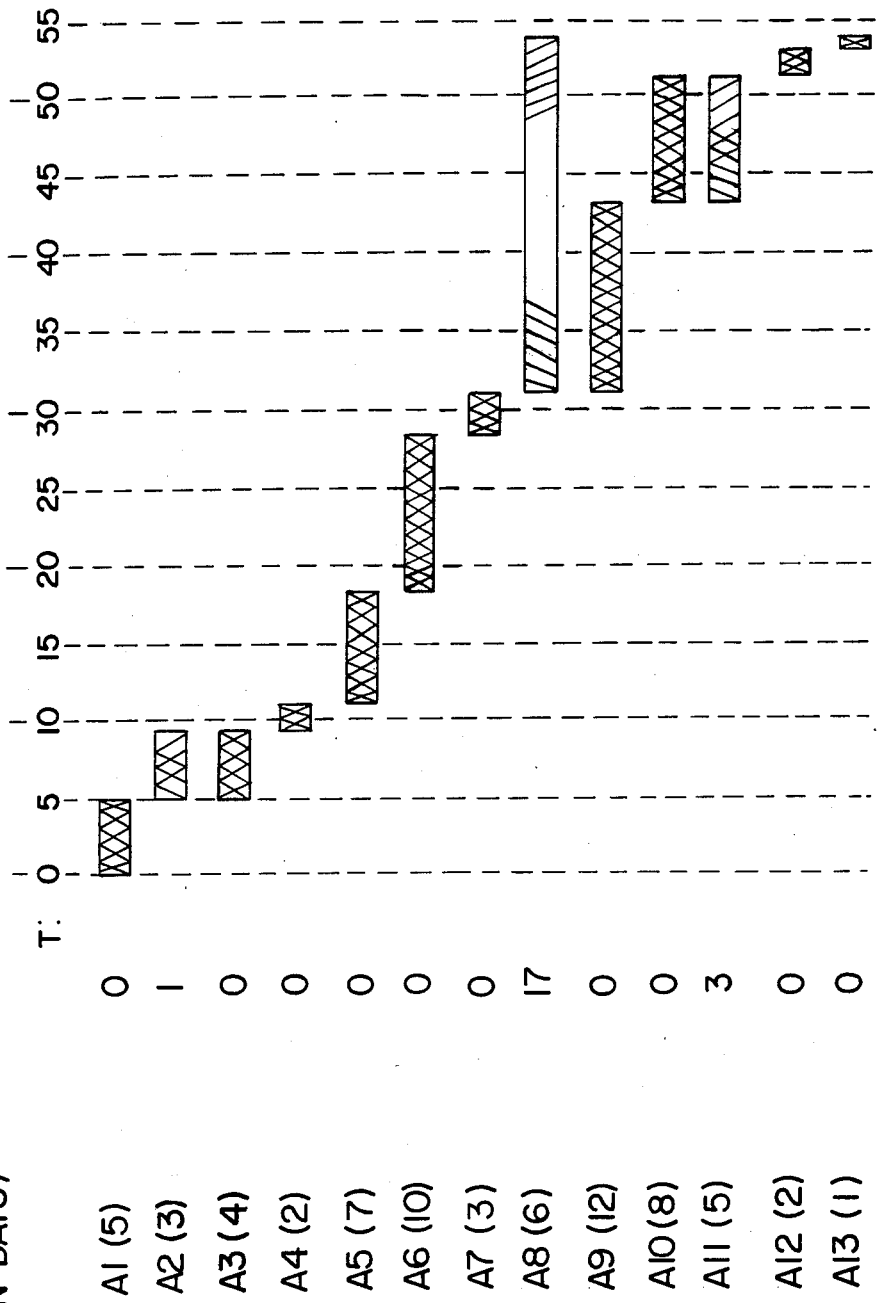
FIG. 5 is a construction project schedule corresponding to the scheduled activities network diagram of the preceding view.

FIG. 5 shows a resulting construction schedule, with a time scale (in days) at the top, and at the left a list of the various activities by indicia (An, where n is the number assigned to the given activity) plus duration (in days). Activity early start and late finish dates (days), respectively, are indicated by the left and right ends of the horizontal bars extending to the right of the respective activity indicia. Inside the bars are both forward and backward slant (or slash) characters, whose leftmost ends indicate the respective early and late start times and whose right ends indicate the respective early and late finish times, as stated in the Legend included in the upper right corner of the drawing. A bar completely cross-hatched by the oppositely slanted characters indicates the duration of an activity without slack, whereas a bar that is not completely cross-hatched indicates presence of slack. Thus, activity A2 has one day of float or slack, activity A8 has seventeen such days, and A11 has three of them. Such a bar chart is an accepted scheduling aid, but its graphical character is only indirectly (verbally) related to the intended resulting structure.

Figure 6:
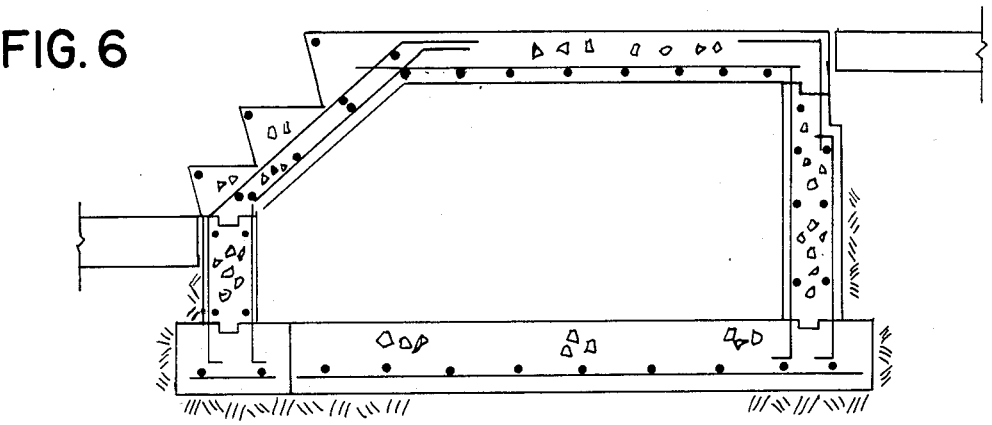
FIG. 6 is a substantially conventional construction drawing of the same scheduled portion of a building construction project.

FIG. 6 shows in sectional elevation the corresponding portion of the scheduled construction project, comprising a plurality of structural increments uncharacterized as to the actual or scheduled order in which they were (or were to have been) completed, together with forms, reinforcing bars, etc. to be used in the construction. Included are a foundation, walls, stairs, and a landing—all rather fragmentarily shown—but adequate for an illustrative example. In more complex drawings, features to be shown might be grouped by type of work activity, location on a drawing, or by subcontractor, for example. As will be apparent, ordering or ranking of pictorial structural increments may be by starting times or completion times (or both can be shown alternately, or on two separate display devices simultaneously). For convenience, the examples here favor completion times as a matter of choice. Shown in normal continuous lines at the middle left and upper right are adjacent structural features not part of the present schedule.

Figure 7:
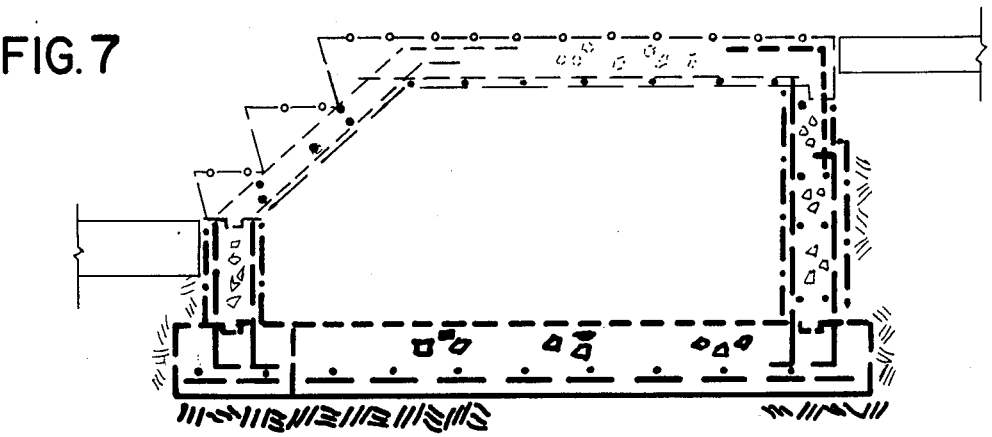
FIG. 7 is a similar drawing of the same building portion, but shaded in accordance with the scheduled start of construction.

FIG. 7 depicts the same structural portion (of FIG. 6) shaded in monochrome according to the scheduled activity completion times (of FIG. 5). Scheduled first as most urgent is the excavation for the foundation, shown accordingly in continuous double-thick lines (which in polychrome would be red, but of merely single thickness). Scheduled next are reinforcing bars—horizontal for the foundation and vertical for the walls—which appear in long-dash thick lines (orange if in color). Next, in short-dash double-thick lines (cf. yellow green) is the concrete foundation itself. Scheduled next are wall forms, shown in thick dot-dash lines (cf. forest green), which—because they are to be removed subsequently—should appear intermittently in diminished intensity, preferably coded to their removal deadline if in an electronic video display (but not here). Structural increments resulting from the next few activities are shown in long-dash single-thickness lines (cf. sky blue): the foundation walls (formed and placed, stripped and backfilled). However, because of the slack in the stripping activity, it may well appear alternately as an item of least urgency (dot-dash, cf. dark brown). Forms for both the stairs and the landing, and the reinforcement for the stairs, scheduled next, are shown in normally thick (thin) short-dash lines (cf. navy blue). The concrete stairs and landing, as well as final stripping, being of lesser priority, are also dot-dashed (cf. dark brown) normal single-thickness lines.

Figure 8:
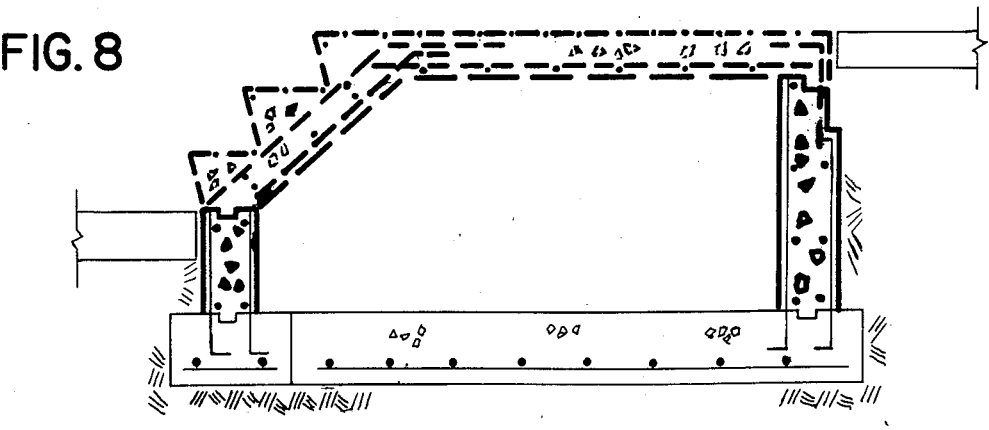
FIG. 8 is a similar drawing of the same building portion, but shaded according to the project status well into the schedule, with part of the scheduled construction overdue for completion.

FIG. 8 shows in similar fashion the same structural portion, in its actual stage of construction on a given day (T29, the start of the second half), but shaded to emphasize construction lagging the schedule. Reference to FIG. 5 indicates that the first six of the activities were to have been completed by T28. A1–A5 are done, so their resultant structural increments are shown in continuous black single-width lines (similar if in color), confirming that the project is on schedule to that extent. However, FIG. 8 shows by is use of solid double-thick lines (cf. red) that A6 (placing forms for the walls) is behind schedule and, thus, very likely to delay subsequent activities, especially those having no scheduled slack (A7, placing wall concrete; A9, forms for stairs and landing; and A10, stairs and landing concrete). Such visual emphasis encourages prompt remedial measures, such as shortening the duration of one or more of the activities, as by enlarging work crews or paying them for overtime—doubtless at increased cost, which can be similarly highlighted in a separate depiction as an aid to decision-making.

In FIG. 8 slack-rich form-stripping step A8 is shaded like A13 (the one-day final form-stripping step) because of their identical completion dates, shown in FIG. 5. Activity A11 (placing landing reinforcing), which also has some slack, is shaded like the similar step of placing reinforcing for the landing because they also have identical required completion dates. According to this invention, as already noted, such slack could be shown readily in a video Display—not here—by flashing between the respective shadings for the activity's scheduled early start and permissible late finish. Two-stage flashing to indicate slack preferably differs from that for showing placing and removal of a structural feature by being of equal intensity in both stages of its showing (compared with a diminished intensity in one of the stages for a removal feature).

Figure 9:
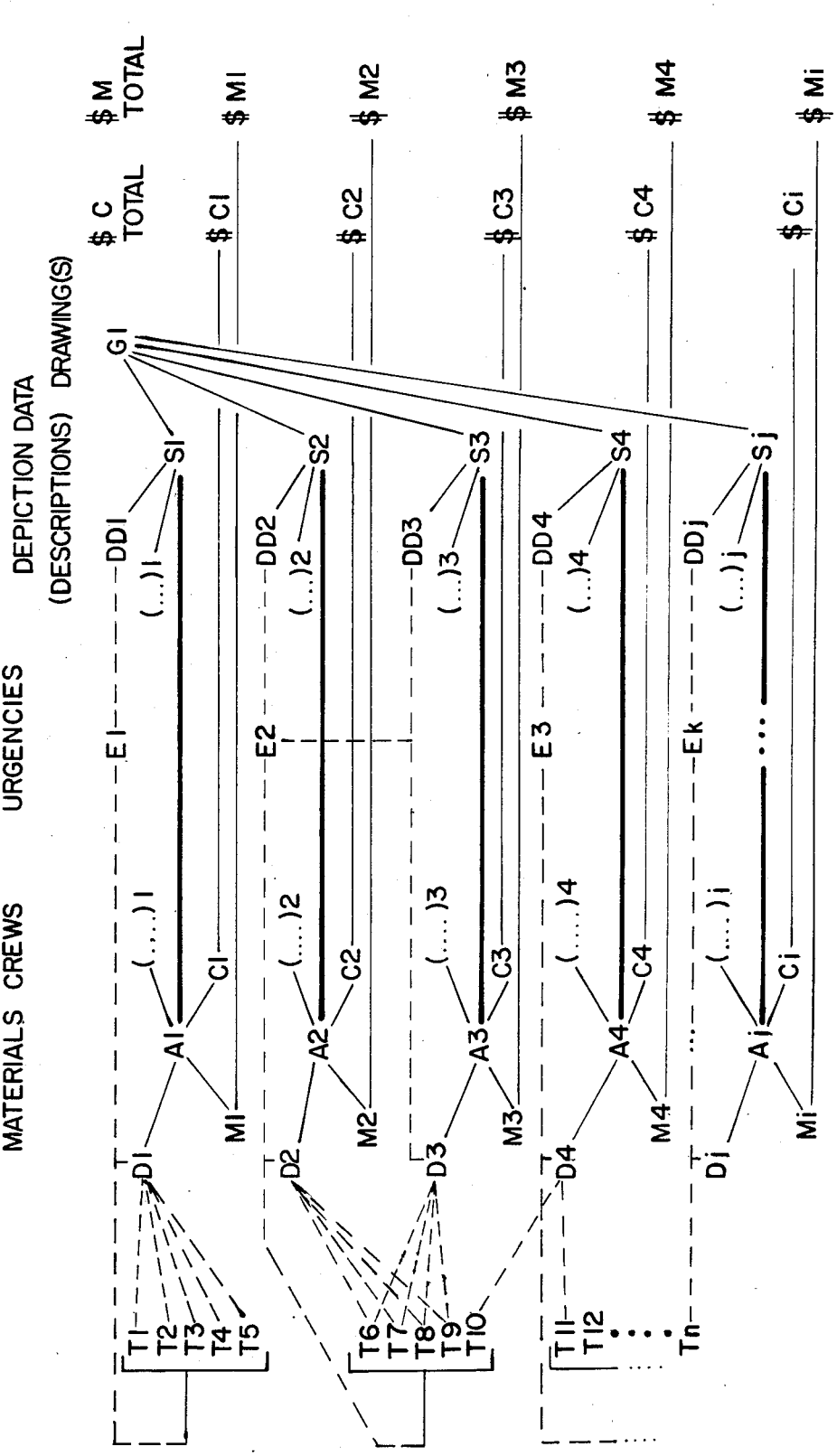
FIG. 9 is a schematic diagram of interrelationships between and among data elements useful according to the present invention.

FIG. 9 shows schematically main data elements under headings: SCHEDULE, ACTIVITIES, EMPHASIS, STRUCTURAL INCREMENTS, and COSTS. The elements are shown in the form of alphabetical indicia, which in general form are $T_n$ for schedule times, $A_i$ for work activities, $E_k$ for shading emphasis, $S_j$ for structural increments, $\$C_i$ for crew costs, and $\$M_i$ for materials costs. In specific occurrences numbers are substituted for the appended lower-case letters, and in the drawing such numbers are more or less sequential. Mentioning of the data elements frequently by name (rather than by indicia) in further discussion of this diagram will be understood as compatible (rather than in conflict) with the principle that the indicia stand for their respective elements in this data base and are often meant when the context fails to indicate otherwise.

Interrelationships among the indicated data elements in FIG. 9 are shown by lines (of various degrees of boldness) joining them. Primary linkage between a given discrete work activity, on the one hand, and the increment(s) of structure produced by that activity, on the other hand, are represented in bold horizontal lines. Each activity has linked to it, as shown by ordinary lines, its duration $D_i$, its crew $C_i$ and materials $M_i$ requirements, and its description ( . . . )i—all expressed here in general terms. Each structural increment has similarly linked to it: its graphical depiction data $DD_j$ and usually also verbal description ( . . . )j. Correspondingly numbered descriptions of activities and structural increments may be merged into composite descriptions, if desired. A many-to-one relationship of structural increments to their source drawings is common, and here they all are linked to only one drawing (G1).

In FIG. 9 the duration of each work activity is linked by dashed lines at the left to the time schedule (shown fragmentarily as a succession of time units T1 to T12 . . . Tn). One such linking line appears for each time unit required by the activity duration. Early and late times—where not identical—would unduly complicate this diagram and, thus, are omitted here for clarity). Successive time units are bracketed into five-unit intervals for convenience of illustration and as an example of a common range (a 5-day week). Other user-defined ranges may be substituted as the user may prefer for review of the project or schedule, and the degrees of emphasis, e.g., shorter ranges in the near term and longer ones further away. Here the listed activities (A1 through A4) and their durations are those of the same example treated in FIG. 5 and corresponding text.

The middle heading in FIG. 9 is EMPHASIS, a concept most often based upon time urgency but sometimes on some other connected data element, such as cost. Here emphasis indicia (for degrees of time urgency or data variance) E1, E2, E3, . . . Ek scale downward, linked to both the duration indicia and the time schedule by broken lines, to indicate that the linkage is subject to changes as time passes. Successive time units (e.g., days) may be deemed to define a fixed reference system, whereas emphasis can be expected to slide fairly regularly past time and relative to the various activities as well, though perhaps not so regularly in the instance of budgeted costs.

Also commonly in many-to-one relations are types (and numbers) of workers and materials, but it is convenient to cross-reference each work activity, in one-to-one manner, to its own crew and materials requirements (shown in FIG. 9 as Ci and Mi). It is apparent that the time schedule is linked to crews, materials, and cost data via the activity indicia (and durations). Crews and materials are linked directly to their costs—shown generally as $Ci and $Mi (at the lower right)—below their individual values and (at the upper right) their totals $C and $M. Of course, averages, dispersions, variances, other statistical and accounting measures, and the like can be calculated for various data categories.

In such a data base representation (as FIG. 9) any given time intersects, somewhat indirectly, at least one activity (usually many more) and structural increment(s), whereupon the array of time intersections with activities and structures constitutes a calendar of the project and may be reconstituted more directly as such—as suggested in dashed lines on the drawing. Moreover, as previously noted, the scheduled and actual construction times for the various structural features provide calendars for them in like manner, and comparison of the structures as scheduled and as actually built readily highlights departures of construction from the original schedule—which may have to be revised from time to time.

Placement of suitable relational links (shown in part in FIG. 9) in digital electronic computer memories (as via memory addresses) is well known in the art and is within the skill of software designers. Also within programming skill are the steps of converting drawn elements of structure to depiction in another medium such as a video display, shading such display with reference to a schedule or related time characteristics, comparing scheduled and actual items and determining differences between them, and annotating a display of structural features graphically with arrows or other symbols and optionally with textural information. The same is true of devising ways of varying such displays by diminished or enhanced intensity, blinking or flashing between normal and varied intensity (including on and off) and other visual modifications that will come to mind.

The drawings to be stored electronically need not be prepared differently from what draftsmen normally provide for construction projects; indeed, some customary annotation of relationships can be eliminated because they will be apparent in the video display. This is not to say that improvements in draftsmanship will not come in handy in preparing drawings for use according to this invention.

Examples of improvements include performing the drafting with implements adapted to store a drawing as soon as it is made (or while it is being made), and utilizing prepared graphical or pictorial symbols for components that can be called up from storage rather than being drawn from scratch every time they are required, also keying the views so that they can be combined into more comprehensive illustrations—all as are becoming well known in the art of computer-aided drafting. These and other measures reduce an already large memory requirement and permit advantageous reduction in paper storage, use, and disposal.

It should be understood that "structural" is used generally in this specification to denote whatever makes up a constructed work (building, bridge, etc.) rather than being interpreted in a more limited structural engineering sense. Thus, electrical, plumbing, and finishing features of construction, for example, may well be treated as structural increments in the practice of the invention, as may collateral activities essential to a construction project, such as hiring personnel, buying or leasing equipment, expediting delivery, and receiving materials on site.

As is well known in the scheduling art, the "early start" date of any given work activity is the earliest date by which all essential prior activities can be (or have been) completed, and the "early finish" date is obtained by adding the minimum duration of that activity to its early start date. The "late finish" date of a given work activity is the latest date by which that activity can be completed without delaying completion of the project, and the "late start" date is obtained by subtracting the minimum duration of that activity from its late finish date. Time units other than days may be more suitable for some projects. The assigned duration for any work activity, if not a fixed number of time units, may be expressed in a range with a stated minimum and a stated maximum, with or without a stated intermediate, such as their mean duration, a defined "most likely" duration, etc. Software for handling these variants will come readily to mind for persons skilled in the art of computer programming.

Accordingly, programs as such do not constitute part of the invention claimed here, whereas marking for display and displaying timely structural features (with or without related data) are subject methods or steps of this invention. It is also apparent that a report generator (program) may be devised so as to enable a human operator to obtain one or more of a wide variety of temporary displays or permanent printouts at the touch of a key or (with voice-recognition equipment) just by an oral request. Indeed, computer programs or software devised or adapted especially for use in effecting the present objectives may be particularly useful—and may be patentable (or not).

Advantages and benefits of this invention have been mentioned above; other advantages may become self-evident to readers of this specification; and ultimately the greatest advantages and benefits can be expected to accrue to those who undertake to practice it. Prominent among the advantages and benefits are increased facility in project scheduling and control, decrease in required personnel and communications, and consequent reduction in costs all around. Some modifications in this invention have been noted above. Others may be made, as by adding, deleting, combining, or subdividing parts or steps, while retaining advantages and benefits of the invention, which itself is defined in the following claims.

I claim:

1. In means to accomplish a building construction project provided with a schedule of discrete work activities to construct increments of structure of the project and provided with drawings of such structural increments, means depicting such structural increments as of a given time in the schedule, and means shading the depicted structural increments with degrees of boldness determined by time characteristics of the depicted structural increments.

2. Construction project means according to claim 1, including display means for depicting selected structural increments with differential boldness.

3. Construction project means according to claim 2, wherein the display means is monochromatic, and boldness of shading comprises lateral thickness in depicted lines.

4. Construction project means system according to claim 2, wherein the display means is polychromatic, and boldness of shading comprises hue of color in depicted lines or areas.

5. Construction project means according to claim 1, wherein the shading means is effective to shade most boldly the increments of structure due for completion by the given time in the schedule, to shade less boldly the increments of structure due for completion within a selected increment of time after the given time, and to shade even less boldly the increments of structure not due for completion until thereafter.

6. Construction project means according to claim 1, wherein the given time is a time during the actual project construction, wherein the shading means is effective to shade most boldly the increments of structure due for completion by the given time, to shade less boldly the increments of structure due for completion within a selected increment of time after the given time, and to shade with an unlike degree of boldness the increments of structure already completed.

7. Construction project means according to claim 1, wherein the given time is a time during the actual project construction, including means for determining the time relationship between the originally scheduled and currently projected completion times for the respective structural increments, and wherein the shading means is effective to shade more boldly the increments of structure whose currently projected completion times are later than as scheduled, and to shade less boldly the increments of structure whose currently projected completion times are as scheduled.

8. Construction project means according to claim 1, wherein the given time is a time during the actual project construction, and wherein the shading means is effective to shade more boldly the increments of structure whose currently projected costs are over the budget, and to shade less boldly the increments of structure whose currently projected costs are within the budget.

9. Construction project means according to claim 1, wherein the given time is a time after the actual construction of the project, and the shading means is effective to shade more boldly the increments of structure whose actual costs exceeded the budget, and to shade less boldly the increments of structure whose actual costs were within the budget.

10. Structural graphics representation system for construction projects, comprising operatively interconnected means for depicting discrete increments of structure for a given project, memory means for retrievably storing data about activities essential to construction of the discrete structural increments and data representing durations of the respective work activities and their sequencing, processing means to calculate therefrom early and late start and finish times for the respective activities and to calculate a resulting time schedule for the period from start to finish of the construction project, input/output means for use in inputting data and instructions to the memory means and to the processing means and in selectively retrieving data therefrom for display including structural increment data to depict selected structural increments thereon, and means for shading structural increments differently in accordance with their scheduled times of completion.

11. Structural graphics system according to claim 10, wherein instructions and data are retrievably stored in the memory means, for effecting diverse shading of these structural increments scheduled to have been completed before a selected time, those increments scheduled for completion then or within a selected time thereafter, and those increments not scheduled for completion until later.

12. Structural graphics system according to claim 11, wherein the stored instructions for time-dependent diverse shading prescribe the boldest diverse such shading for depiction of those structural increments due for completion at—or within the selected time after—the given time, and less bold such shading for increments not due until later.

13. Structural graphics system according to claim 12, wherein stored instructions for monochromatic shading prescribed boldness in terms of longitudinal continuity and lateral thickness of line.

14. Structural graphics system according to claim 12, wherein stored instructions for polychromatic shading prescribe boldness in terms of colors ordered in selected hues and brightnesses.

15. Structural graphics system according to claim 11, wherein stored instructions prescribe diminished intensity of depiction for a structural feature to be removed during the project.

16. Structural graphics system according to claim 11, wherein stored instructions prescribe intermittent switching of depiction, for a structural feature to be placed during the project and then removed later during the project, between one such diverse shading for the feature's placement time and another such diverse shading for its removal time.

17. In means for construction of a building, bridge, dam, industrial plant, or means of transport, whereby a schedule of discrete work activities is prepared for constructing corresponding increments of structure of the project, and whereby depictions of such resulting structural increments in construction drawings are also prepared, the improvement comprising means for depicting the corresponding structure as in such construction drawings, as of a given time within the schedule, including means for shading the respective structural increments with degrees of boldness corresponding to respective time relationships relative to the given time.

18. Construction project means according to claim 17, including means for displaying such depiction as a non-transient image.

19. Construction project means system according to claim 9, wherein a structural increment is scheduled for removal, and including means in the shading means for showing it shaded in diminished intensity.

20. Construction project means according to claim 18, including as display means a printer.

21. Construction project means according to claim 17, including means for displaying such depiction as a dynamic transient image.

22. Construction project means system according to claim 12, wherein a given structural increment is scheduled to be placed before being removed, and including means in the shading means for showing it alternately shaded according to its placement time and its removal time.

23. Construction project means according to claim 21, including as display means a video screen.

24. Means for use in construction of a building, bridge, dam, industrial plant, or means of transport, wherein work activities are performed to build increments of structure according to drawings thereof and a time schedule therefore, such means comprising means for storing the schedule and the structural drawings for retrieval, means for retrieving such structural drawings corresponding to the status of the project as of any given time in the schedule, and means for shading the respective structural increments as of such given time with degrees of boldness corresponding to selected construction characteristics.

25. Construction project means according to claim 24, including in the storage means a read-write memory containing data defining the actual construction.

26. Construction project means according to claim 25, including means for comparing the read-write memory of the actual construction with the read-only memory of the scheduled construction in terms of the selected construction characteristics.

27. Construction project means according to claim 24, including in the storage means a read-only memory containing data defining the scheduled construction.

28. In means for construction of a building, bridge, dam, industrial plant, or means of transport, wherein certain work activities are performed to build discrete increments of structure according to a given time schedule, the improvement comprising comparing scheduled and actual structure of such increments at a given time in the schedule during actual construction, depicting most boldly incomplete structural increments scheduled for completion within a selected incremental period of time from the given time, and altering the construction rate to bring the completion of incomplete structural increments into closer agreement with their scheduled construction times.

29. Project construction process according to claim 28, including enlarging work crews to increase the actual rate of construction.

30. In means for construction of a building, bridge, dam, industrial plant, or means of transport, wherein certain costs are budgeted and work activities are performed to build discrete increments of structure according to a given time schedule, the improvement comprising comparing scheduled and actual structure of such increments at a given time in the schedule during actual construction, depicting most boldly incomplete structural increments scheduled for completion within a selected incremental period of time from the given time but running over budgeted costs, and altering the costs of work activities for incomplete structural increments to bring the costs of completion into closer agreement with their budgeted construction costs.

31. Project construction process according to claim 30, including reducing work crews to decrease their contribution to construction costs.

32. In accomplishing a building construction project wherein discrete work activities are performed to construct increments of structure of the project according to drawings of such structural increments and according to a construction schedule, the steps of depicting as of a given time the existing extent of the structural increments under construction, shaded with more or less boldness to indicate more or less discrepancy between their actual extent and scheduled extent when behind schedule, and takin appropriate steps to reduce such degree of discrepancy of the most boldly shaded structural increments.

33. Building construction method according to claim 32, wherein such appropriate steps include reducing the overall time to construct the most boldly shaded structural increments.

34. Building construction method according to claim 33, wherein such appropriate steps include increasing the actual man-hours beyond the man-hours scheduled for the work activities to construct the most boldly shaded structural increments.

* * * * *